(12) United States Patent
Todesco

(10) Patent No.: US 11,969,926 B2
(45) Date of Patent: Apr. 30, 2024

(54) SELF-SUFFICIENT SEQUENTIAL LOCKING DEVICE FOR INJECTION MOLDING TOOL

(71) Applicant: FOREFRONT MEDICAL TECHNOLOGY PTE LTD, Singapore (SG)

(72) Inventor: Pierre Todesco, Singapore (SG)

(73) Assignee: FOREFRONT MEDICAL TECHNOLOGY PTE LTD, Singapore (SG)

( * ) Notice: Subject to any disclaimer, the term of this patent is extended or adjusted under 35 U.S.C. 154(b) by 696 days.

(21) Appl. No.: 16/606,210

(22) PCT Filed: Apr. 11, 2018

(86) PCT No.: PCT/SG2018/050183
§ 371 (c)(1),
(2) Date: Oct. 17, 2019

(87) PCT Pub. No.: WO2018/194516
PCT Pub. Date: Oct. 25, 2018

(65) Prior Publication Data
US 2023/0202085 A1    Jun. 29, 2023

(30) Foreign Application Priority Data
Apr. 18, 2017 (SG) .......................... 10201703169Q

(51) Int. Cl.
*B29C 45/26* (2006.01)
*B29C 45/66* (2006.01)

(52) U.S. Cl.
CPC .......... *B29C 45/2602* (2013.01); *B29C 45/66* (2013.01); *B29C 2045/2604* (2013.01)

(58) Field of Classification Search
CPC ................ B29C 45/66; B29C 45/2675; B29C 2045/664; B29C 2045/2604
See application file for complete search history.

(56) References Cited

U.S. PATENT DOCUMENTS

2002/0106420 A1* 8/2002 Vandenberg ........ B29C 45/2602
425/556
2010/0323051 A1* 12/2010 Helenius ................. F16B 21/04
425/161

FOREIGN PATENT DOCUMENTS

GB            2470285 A   * 11/2010    ......... B29C 45/2602

\* cited by examiner

*Primary Examiner* — Alison L Hindenlang
*Assistant Examiner* — Virak Nguon
(74) *Attorney, Agent, or Firm* — FisherBroyles, LLP; Robert Kinberg

(57) ABSTRACT

Embodiments of the invention provide a self-sufficient sequential locking device and an injection molding tool. The self-sufficient sequential locking device comprises an elongate body having two ends which are provided with first and second inner engagement elements respectively; first and second outer engagement elements selectably engageable with the first and second inner engagement elements respectively for alternatively establishing a first or a second connection by rotation of the elongate body between a first position in which the first connection is secured and the second connection is simultaneously releasable, and a second position in which the second connection is secured and the first connection is simultaneously releasable, and first and second locking element respectively cooperable with the first and second inner engagement element for securing the first connection when the elongate body is in the first position or the second connection when the elongate body is in the second position.

20 Claims, 13 Drawing Sheets

SELF-SUFFICIENT SEQUENTIAL LOCKING DEVICE FOR INJECTION MOLDING TOOL

FIELD OF INVENTION

The invention generally relates to injection molding, especially a self-sufficient sequential locking device which is able to secure/release different parting lines/layers/surfaces (hereinafter referred to as "parting lines") of an injection molding tool according to a predetermined sequence without the need for external actuator or controller.

BACKGROUND

Injection molding using sequential technology is also named as Tandem technology which requires an exclusive sequential locking device/latch for alternately securing or releasing two parting lines of the injection molding tool in sequence to increase productivity of injection molding processes.

However, the existing locking devices/latches for injection molding tool require external actuators or controllers for their operation, e.g. a hydraulic system, or an air pressurized system, which not only significantly increase the manufacturing, installation and/or operating costs of the locking device and the injection molding tool, but also may cause some other problems/constraints relating to manufacturing or operation of the injection molding tool.

In a first example of an existing locking device, a hydraulic system is used to activate the sequence of the locking latch. The hydraulic system may be a subsystem from an injection molding tool incorporating the locking device or an external hydraulic generator. However, hydraulic system may not be suitable for production of plastic parts dedicated to medical devices which have to be contamination-free. As hydraulic system requires use of oil, this could contaminate the produced plastic parts and thereby rendering the produced parts unsuitable for medical usage.

In a second example, an air pressurized system is used to activate the sequence of the locking device. However, production room pressure is typically at six bars, and this would impose a constraint on the power generated by the air pressurized system. To increase the power generated by the air pressurized system, piston diameter may be increased or multiple cylinders may have to be installed in the sequential molding tool. Either way, there would be a substantial increase in the size or height of the sequential molding tool incorporating the locking device.

In a third example as illustrated in UK patent GB 2470285 B, to activate the sequential molding tool, a double locking device is used to generate a movement in a perpendicular direction to the opening of the sequential molding tool such that one side of the device is released and at the same time, the other side is secured. A simple pneumatic device may be used in this solution since it requires less pressure from the piston. However, as the double locking device has to be installed on the external side of the sequential molding tool, the double locking device tends to cover the whole central area of the sequential molding tool, which removes the possibility of adding all the cooling input and output suitable for the sequential tool and restraining perfect optimization of the cycle time in some circumstances.

In a fourth example, an electro-magnetic latch is used to activate the sequential molding tool. This solution removes the need for oil associated with a standard hydraulic system. However, as the heat generated by the electromagnets would cause unexpected thermal expansion, insulators and possibly extra cooling channels would be required to isolate other parts of the sequential tool from the electromagnetic latch. This would inevitably increase the size of the sequential molding tool if thick plates are used as insulators or cooling channels.

It is therefore desirable to provide a self-sufficient sequential locking device for an injection molding tool, which addresses the above and other problems.

SUMMARY OF INVENTION

Embodiments of the invention provide an entirely mechanical self-sufficient sequential locking device which is suitable for an injection molding tool, e.g. a sequential molding tool or an overmolding tool. The sequential locking device is configured to practise an alternating sequence of locking and unlocking (securing and releasing) at each side of the device such that one side is locked while the other side is simultaneously unlocked. This alternating securing and releasing of two sides of the sequential locking device is actuated by mechanical engagement or disengagement of its own components instead of an additional actuator. When the sequential locking device is used in an injection molding tool, the mechanical engagement/cooperation in the sequential locking device for actuating alternating securing and releasing of two sides of the sequential locking device is solely actuated by alternating securing and releasing of two side portions in the injection molding tool, without requiring any external control.

According to a first aspect of the invention, a self-sufficient sequential locking device is provided. The self-sufficient sequential locking device comprises:

an elongate body having two ends which are provided with a first and a second inner engagement element respectively;

a first and a second outer engagement element selectably engageable with the first and second inner engagement elements respectively for alternatively establishing a first or a second connection by moving the elongate body between a first position in which the first connection is secured and the second connection is simultaneously releasable, and a second position in which the second connection is secured and the first connection is simultaneously releasable, and a first locking element cooperable with the first inner engagement element for securing the first connection when the elongate body is in the first position and a second locking element cooperable with the second inner engagement element for securing the second connection when the elongate body is in the second position wherein the moving of the elongate body between the first and the second position is mechanically actuated by engagement of the first outer with the first inner engagement element or the second outer with the second inner engagement element.

In one embodiment of the first aspect wherein the sequential locking device is incorporated in an injection molding tool, engagement of the first outer with the first inner engagement element or the second outer with the second inner engagement element to alternatively establish the first or the second connection, is solely actuated by alternating securing and releasing of parting lines in the injection molding tool.

Further, the cooperation of the first locking element with the first inner engagement element or the second locking element with the second inner engagement element to alternatively secure the first or the second connection is solely actuated by alternating securing and releasing of parting lines in the injection molding tool.

According to a second aspect of the invention, an injection molding tool is provided. The injection molding tool comprises a central portion, first and second side portions releasably coupled to the central portion; and
   a self-sufficient sequential locking device as mentioned above,
   wherein the elongate body of the locking device is incorporated at the central portion of the injection molding tool, the first outer engagement element and the first locking element of the locking device are incorporated at the first side portion; and the second outer engagement element and the second locking element of the locking device are incorporated at the second side portion,
   wherein when the elongate body is in a first position, the first connection is secured by the first locking element such that the first side portion is locked to the central portion, while the second connection is releasable such that the second side portion is releasable from the central portion; and
   when the elongate body is in the second position, the first connection is releasable such that the first side portion is releasable from the central portion, while the second connection is secured by the second locking element such that the second side portion is locked to the central portion.

In one embodiment of the second aspect, the injection molding tool is a sequential molding tool.

In another embodiment of the second aspect, the injection molding tool is an overmolding tool, wherein the central portion includes a core plate of the overmolding tool, the first side portion includes a back plate and a spacer plate which is remote from the central portion, and the second side portion includes a cavity plate.

According to a third aspect of the invention, a method for sequentially locking first and second side portions of an injection molding tool to an central portion thereof is provided. The method comprises:
   using alternating securing and releasing of the first and second side portions of the injection molding tool,
   engaging, in alternating sequence, the first outer engagement element with the first inner engagement element to establish the first connection, and the second outer engagement element with the second inner engagement element to establish the second connection, by moving the elongate body between the first position and the second position; and cooperating, the first locking element with the first inner engagement to secure the first connection when the elongate body is in the first position, and cooperating the second locking element with the second inner engagement to secure the second connection when the elongate body is in the second position.

According to a fourth aspect of the invention, a method for installing a self-sufficient sequential locking device to an injection molding tool which includes a central portion, and a first and a second side portion releasably coupled to the central portion is provided. The method comprises:
   incorporating an elongate body of the locking device at the central portion of the injection molding tool;
   incorporating a first outer engagement element and a first locking element of the locking device at the first side portion; and
   incorporating a second outer engagement element and a second locking element of the locking device at the second side portion, such that
   alternating securing and releasing of the first and second side portions in the injection molding tool actuates engagement of a first outer with a first inner engagement element or a second outer with a second inner engagement element to alternatively establish a first or a second connection, and cooperation of the first locking element with the first inner engagement element or the second locking element with the second inner engagement element to alternatively secures the first or the second connection.

As the self-sufficient sequential locking device is an entirely mechanical system without the need for any additional activator or controller, the above-identified problems faced by existing locking devices/latches will be solved. Specifically, the manufacturing, operating and installation cost of the sequential locking device and/or the injection molding tool will be greatly reduced. Accordingly, production costs (for producing injected plastic parts) by such injection molding tools will be reduced. Further, the sequential locking device is suitable for producing components of medical devices since no hydraulic system is required to activate the locking device and therefore no oil contamination will be introduced to the manufactured articles. Furthermore, the size of the sequential molding tool will not be substantially increased, and the installation of the injection molding tool is simplified since no external activator or control is required. Also, the operation of the injection molding tool will become easier as no configuration parameters need to be pre-defined and pre-set during installation or adjusted during operation thereof.

BRIEF DESCRIPTION OF THE DRAWINGS

The invention will be described in detail with reference to the accompanying drawings, in which.

DETAILED DESCRIPTION OF EMBODIMENTS OF THE INVENTION

Figure 1:
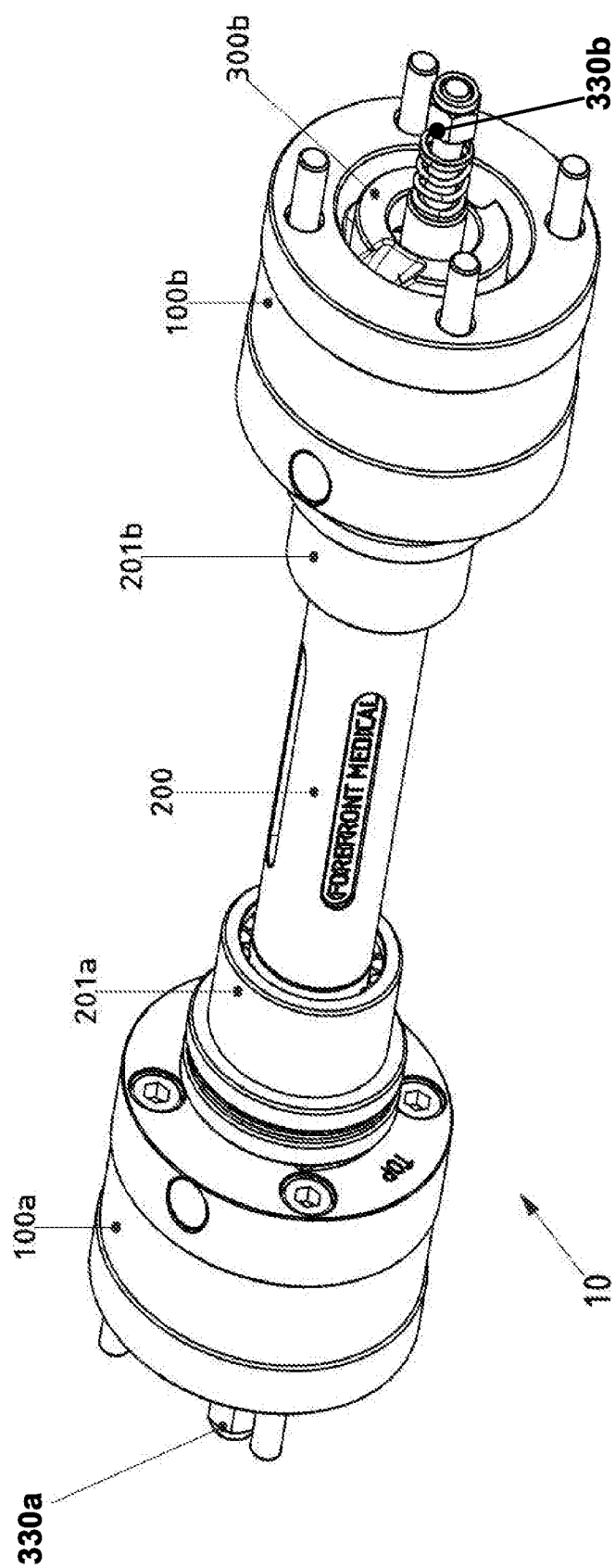
FIG. 1 is a full isometric view of a self-sufficient sequential locking device according to one embodiment of the invention.

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention. In the drawings, like reference numerals refer to same or similar functionalities or features throughout the several views.

Figure 2A:
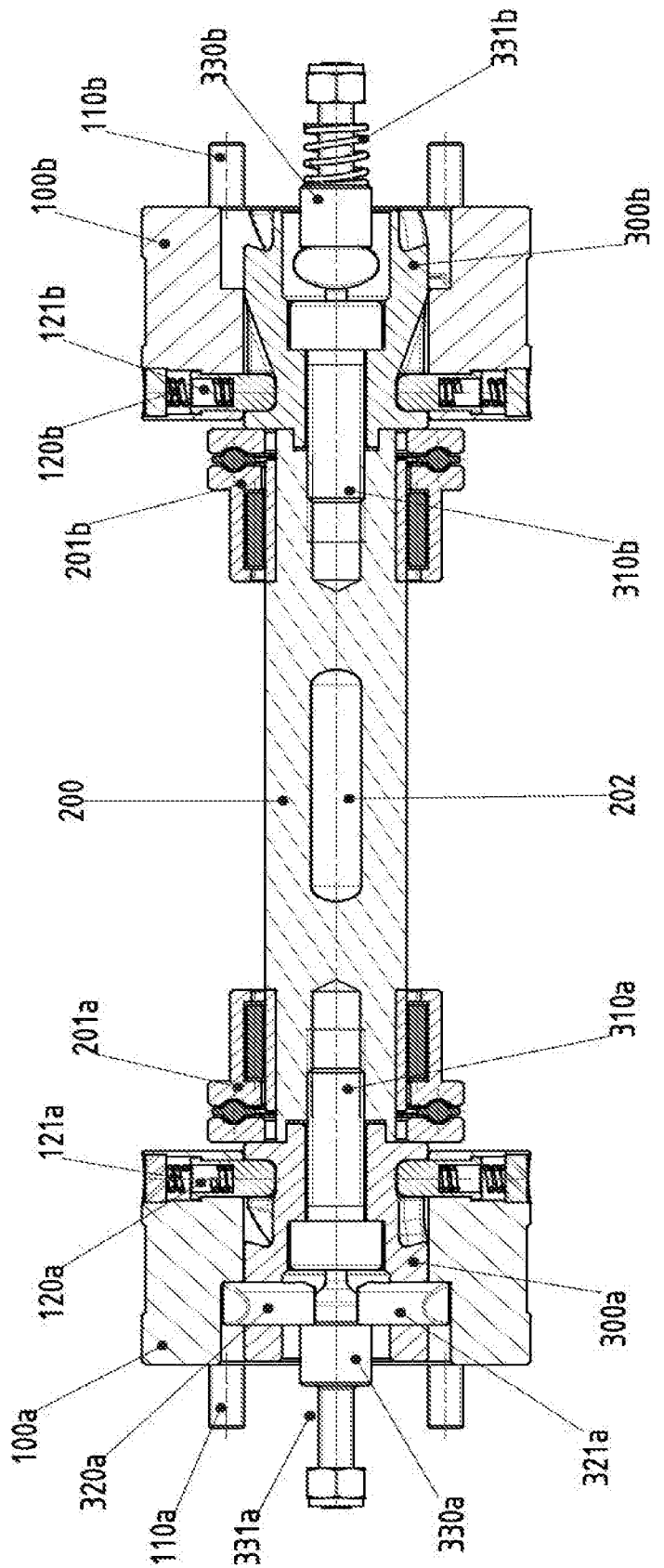
FIG. 2A is a sectional view of the self-sufficient sequential locking device in FIG. 1.
Figure 2B:
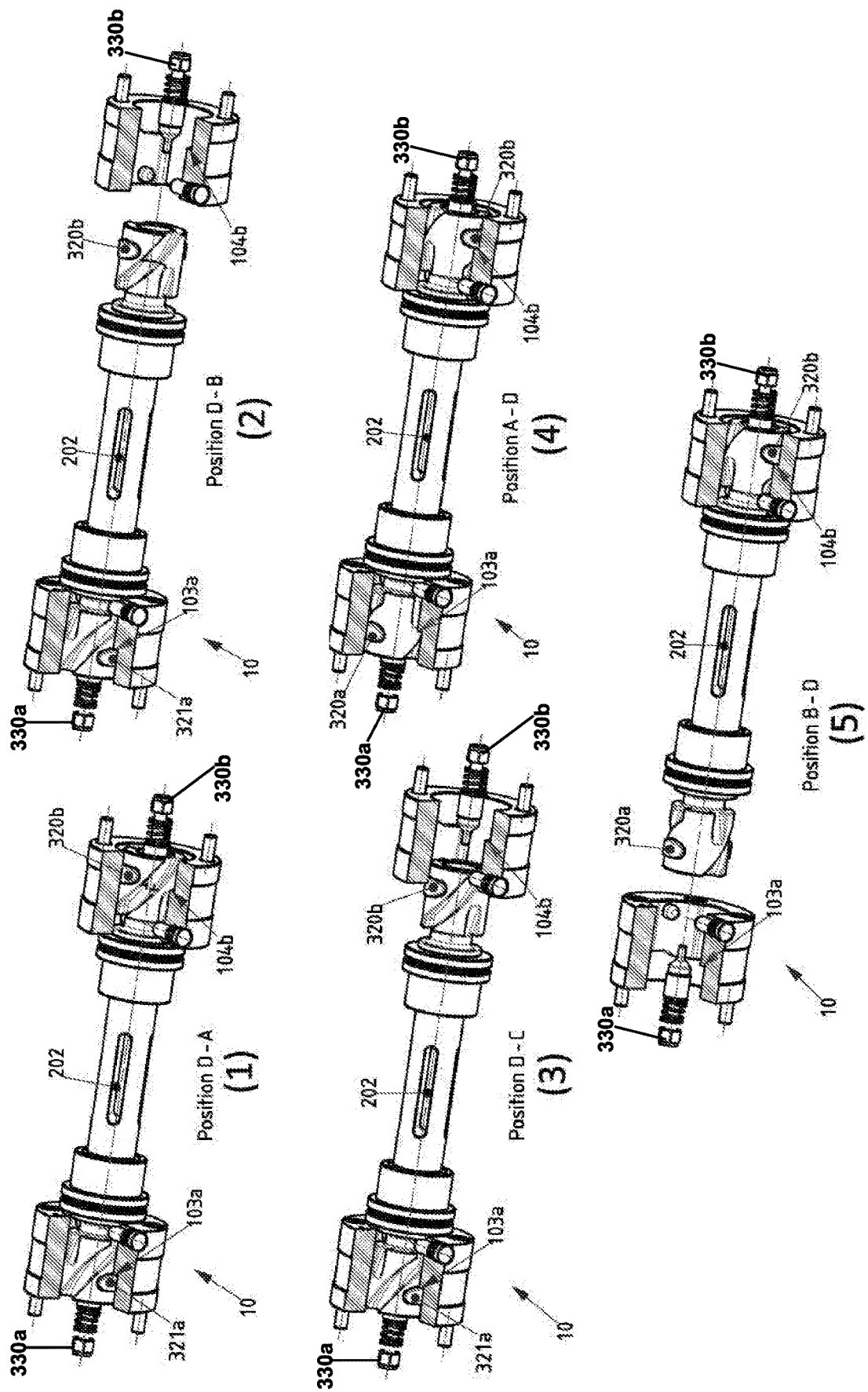
FIG. 2B shows five isometric views, including cutaway views, of the self-sufficient sequential locking device illustrating sequential operation of the self-sufficient sequential locking device.
Figure 2C:
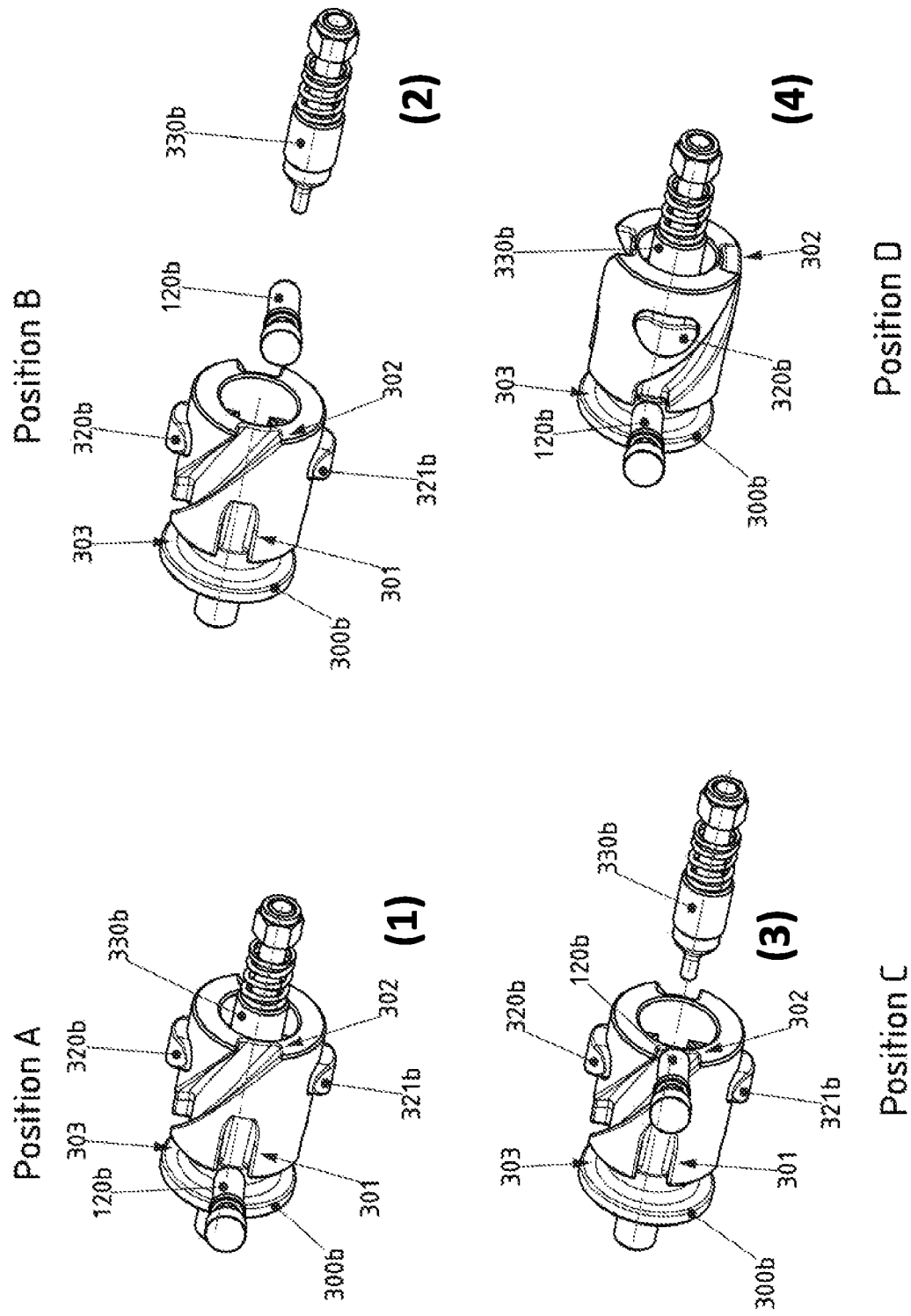
FIG. 2C shows four isometric views of the right inner engagement element and right locking element of the self-sufficient sequential locking device, which illustrate four different positions of the locking device.

Self-Sufficient Sequential Locking Device
Structure of Self-Sufficient Locking Device FIG. 1 is a full isometric view of a self-sufficient sequential locking device 10 according to one embodiment of the invention. FIG. 2A is a sectional view of the self-sufficient sequential locking device 10 in FIG. 1. FIGS. 2B and 2C are isometric views of the locking device 10 and illustrate the detailed structure of the locking device 10 and sequential operation of the locking device 10. The structure of the sequential locking device 10 will be described in detail below referring to FIGS. 1, and 2A to 2C.

Referring to FIGS. 1 and 2A, in this embodiment, the sequential locking device 10 includes left and right outer engagement elements 100a and 100b, a shaft 200, left and right inner engagement elements 300a and 300b, and left and right locking elements 330a and 330b. As shown in FIG. 2A, the left and right inner engagement elements 300a and 300b are attached to the shaft 200 by screws 310a and 310b respectively to form an elongate body. It should be noted that in some other embodiments, the elongate body may be an integrally formed component, i.e. the shaft 200 is integrally formed with the left and inner engagement elements 300a and 300b, or the left and right inner engagement elements 300a and 300b are attached to the shaft 200 by other suitable attachment means.

To realize the self-sufficient sequential operation of the locking device 10, the left and right outer engagement elements 100a and 100b are configured to alternately engage with the left and right inner engagement elements 300a and 300b respectively to trigger a movement, e.g. rotation, of the elongate body between a first position and a second position. When the elongate body is in the first position, a left connection between the left outer engagement element 100a and the left inner engagement element 300a is established and secured, while a right connection between the right outer engagement element 100b and the right inner engagement element 300b is releasable; and when the elongate body is in the second position, the right connection is established and secured, while the left connection is simultaneously releasable.

Referring to FIGS. 2A and 2B, in this embodiment, each of the left and right outer engagement elements 100a/100b includes a tubular structure, an engagement means 120a/120b and fixed stoppers (103a,104a)/(103b,104b). The engagement means 120a/120b and the fixed stoppers (103a, 104a)/(103b, 104b) are provided on an inner surface of the tubular structure of the corresponding outer engagement element 100a/100b. The engagement means 120a/120b in this embodiment includes a projection member and a resilient means 121a/121b, e.g. a spring. The resilient means 121a/121b biases the projection member to abut against the inner engagement element 300a/300b when the inner engagement element 300a/300b is received by the outer engagement element 100a/100b.

Referring to FIGS. 2B and 2C, each of the left and right inner engagement elements 300a and 300b includes a tubular structure and a pair of self-retracting stoppers (320a, 321a)/(320b,321b) provided thereon. On the outer surface of the tubular structure of each inner engagement element 300a/300b, there are provided a straight groove 301 and a helicoidal groove 302 fluidly coupled to the straight groove 301 through a circular groove 303.

The engagement means 120a/120b provided on the outer engagement element 100a/100b is biased by the resilient means to abut against the helicoidal groove 302 on the inner engagement element 300a/300b, and adapted to engage with/move along the helicoidal groove 302 to rotate the elongate body between the first position and the second position such that the left connection and the right connection are secured in alternating sequence. The engagement means 120a/120b is also adapted to engage with/move along the straight groove on the inner engagement element 300a/300b for releasing the left or right connection in accordance with the alternating sequence.

Referring to FIGS. 2A to 2C, the left and right locking elements 330a and 300b are releasably cooperable with/insertable into the left and right inner engagement elements 300a and 300b respectively for securing the left connection when the elongate body is in the first position and securing the right connection when the elongate body is in the second position. In this embodiment, each of the left and right locking elements 330a/330b includes an insertion portion and a resilient means 331a/331b for biasing the insertion portion into a corresponding inner engagement element 300a/300b to secure the first or second connection.

When the elongate body is in the first position (referring to FIG. 2B (1)), the left locking element 330a is inserted into the tubular structure of the left inner engagement element 300a to prevent the retraction of the self-retracting stoppers (320a, 321a). Thus, the left connection is secured by the engagement of the self-retracting stoppers (320a, 321a) with the fixed stopper (103a, 104a). Similarly, when the elongate body is in the second position (referring to FIG. 2B (4)), the right locking element 330b is inserted into the tubular structure of the right inner engagement element 300b to prevent the retraction of the self-retracting stoppers (320b, 321b). Thus, the right connection is secured by the engagement of the self-retracting stoppers (320b, 321b) with the fixed stopper (103b, 104b).

Referring to FIG. 1 or FIGS. 2A to 2B, the locking device 10 may further include a manual rotation activator 202 provided on the shaft 200. With this manual rotation activator 202, the elongate body of the locking device 10 may be manually rotated. Further, both the right and left connection of the locking device 10 may be secured simultaneously by manually operating the manual rotation activator 202 to prevent releasing of any connection during installation or transportation of the locking device 10, or for any other purposes.

Sequential Operation of Self-Sufficient Locking Device

For explanation of the sequential operation of the locking device 10, it is assumed that in this embodiment as shown in FIG. 2B (1), the initial position of the elongate body is in the first position and the initial position of the locking device 10 is in "Position D-A". In "Position D-A", the left side of the locking device 10 is in position D and the right side of the locking device 10 is in position A as shown in FIG. 2C (1). When the left side is in position D, the left connection between the left outer engagement element 100a and the left inner engagement element 300a is secured by engagement of self-retracting stoppers (320a, 321a) with the fixed stoppers (103a, 104a). When the right side is in position A, the engagement means 120b is ready to move along the straight groove, and the self-retracting stoppers (320b, 321b) are not engageable with the fixed stoppers (103b, 104b) due to their relative positional relationship such that the right connection is releasable.

In the first step of the sequential operation, as shown in FIG. 2B (2), the locking device 10 moves from "Position D-A" to "Position D-B". In "Position D-B", the elongate body is kept in the first position and the left side of the locking device 10 is kept in position D, while the right side of the locking device 10 moves to position B as shown in FIG. 2C (2), in which the right connection between the right outer engagement element 100b and the right inner engagement element 300b is released, i.e. the right outer engagement element 100b is disengaged from the right inner engagement element 300b.

In the second step of the sequential operation, as shown in FIG. 2B (3), the locking device 10 moves from "Position D-B" to "Position D-C". In "Position D-C", the left side of the locking device 10 is kept in position D, while the right side of the locking device 10 moves to position C as shown in FIG. 2C (3), in which the right outer engagement element 100b starts to engage with the right inner engagement element 300b, i.e. move along the helicoidal groove on the right inner engagement element 300b, to trigger rotation of the elongate body from the first position to the second position.

In the third step of the sequential operation, as shown in FIG. 2B (4), the locking device 10 moves from "Position D-C" to "Position A-D". In "Position A-D", the elongate body is rotated about 90 degrees from the first position to the second position, the left side of the locking device 10 moves to position A and the right side of the locking device 10 moves to position D as shown in FIG. 2C (4). When the left side is in position A, the engagement means 120a is ready to move along the straight groove, and the self-retracting stoppers (320a, 321a) are not engageable with the fixed stopper (103a, 104a) due to their relative positional relationship. Thus, the left connection between the left outer engagement element 100a and the left inner engagement element 300a is releasable. When the right side of the locking device 10 is in position D, the right connection between the right outer engagement element 100b and right inner engagement element 300b is secured by engagement of the self-retracting stoppers (320b, 321b) with the fixed stopper (103b,104b).

In the fourth step of the sequential operation, as shown in FIG. 2B (5), the locking device 10 moves from "Position A-D" to "Position B-D". In "Position B-D", the elongate body is kept in the second position and the right side of the locking device 10 is kept in position D, while the left side moves to position B, in which the left connection between the left outer engagement element 100a and the left inner engagement element 300a is released, i.e. the left outer engagement element 100a is disengaged from the left inner engagement element 300a.

Figure 2D:
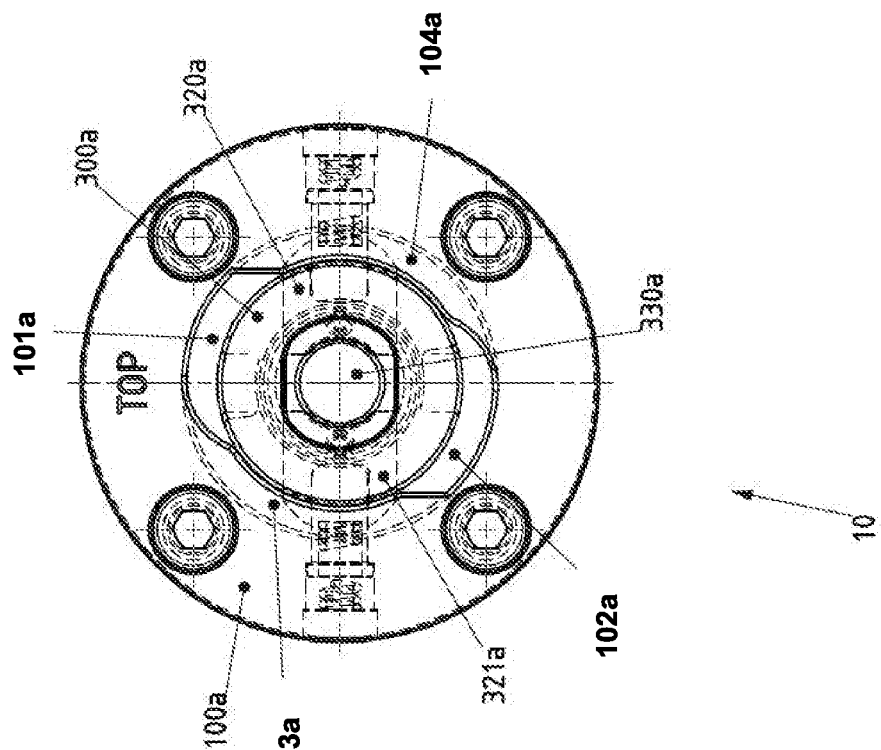
FIG. 2D shows side views of the locking device illustrating the left side of the locking device in position A and position D.
Figure 2D:
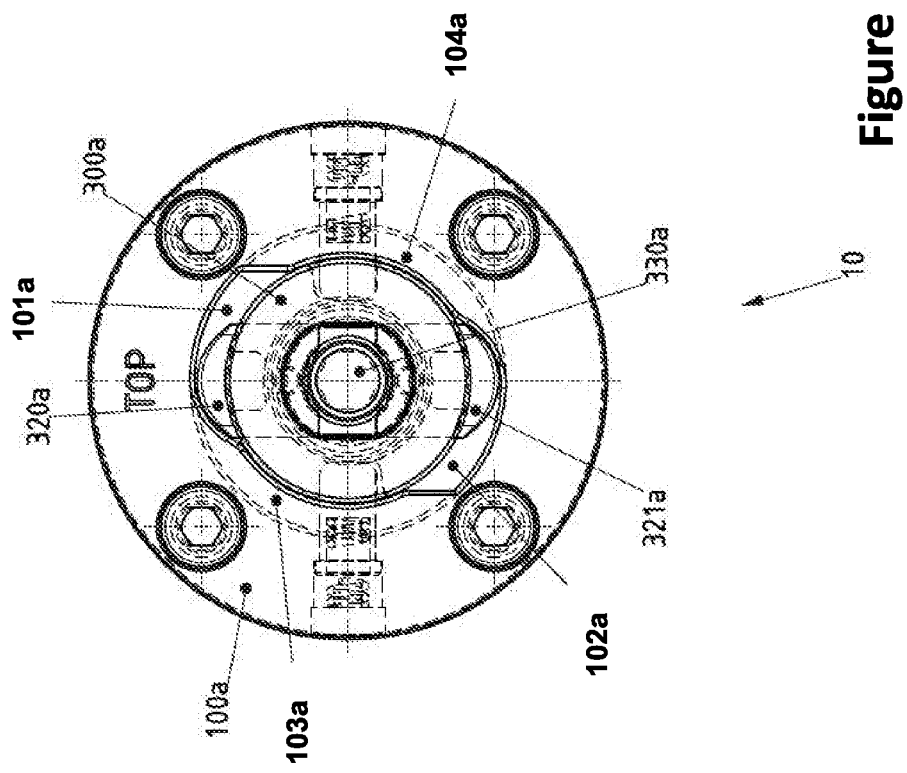
Figure 2E:
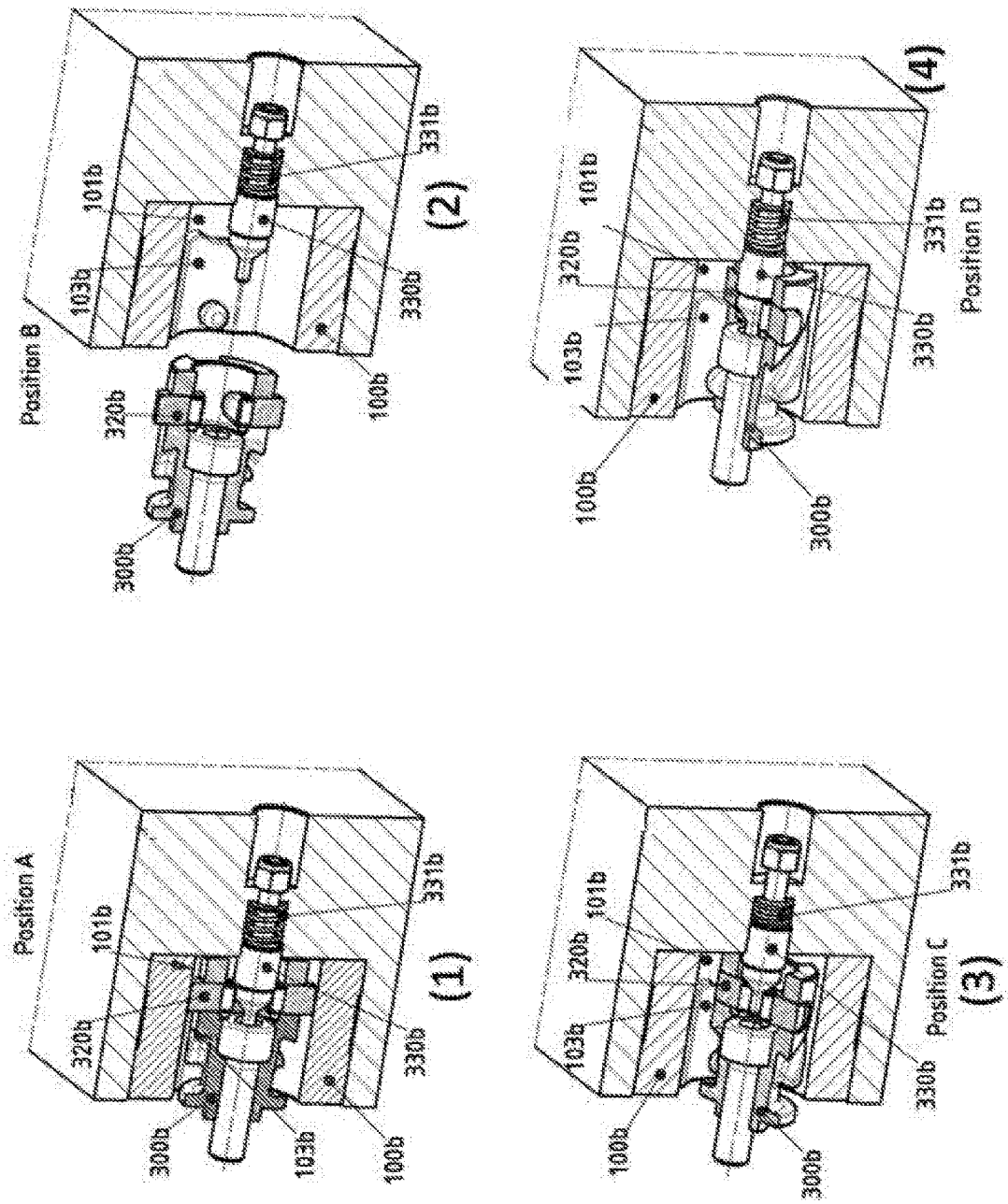
FIG. 2E shows partial isometric views of the right side of the sequential locking device, which illustrate four different positions of the locking device.

In this embodiment, the fixed stoppers (103a,104a)/(103b,104b) provided on the inner surface of the outer engagement element 100a/100b include a recess-protrusion structure as shown in FIG. 2D and FIG. 2E (1)-(4). FIG. 2D provides front views of the locking device 10 and illustrates the left side of the locking device 10 in position A and position D to clearly show the relative positional relationship between the self-retracting stoppers (320a 321a) and the fixed stoppers (103a, 104a).

When the locking device 10 is in position A, the self-retracting stoppers (320a 321a) are aligned with the recesses (101a, 102a), i.e. not receivable into the recesses (101a, 102a) and thereby are not engageable with the fixed stoppers (103a, 104a). As this prevents disengagement of the left outer engagement element 100a from the left inner engagement element 300a, the left connection is thus releasable in position A. When the locking device 10 is in position D, the self-retracting stoppers (320a, 321a) are rotated to be perpendicular to the recesses (101a, 102a) such that the self-retracting stoppers (320a, 321a) are extendable therein and engageable with the fixed stoppers (103a, 104a). As this prevents disengagement of the left outer engagement element 100a from the left inner engagement element 300a, the left connection is thus secured.

Referring to FIG. 2E (1) to (4), the right side of the locking device 10 is taken as an example to explain the cooperation of the locking element 300a/300b with the inner engagement element 300a/300b. In this example, the locking element 330b includes an insertion portion having a front part, middle part and an end part, and the resilient means 331b, e.g. a spring. The inner engagement element 300b includes a tubular structure which provides a channel for receiving the inserted locking element as well as the self-retracting stopper (320b, 321b) provided on the tubular structure.

When the right side is in position A, the elongate body is in the first position in which the right connection between the right outer engagement element 100b and the right inner engagement element 300b is releasable. Referring to FIG. 2E(1), in this position, the locking element 330b is completely received into the channel of the right inner engagement element 300. The self-retracting stopper 320b is in an extended state and aligned with the corresponding recess 101b, i.e. not receivable into the recess 101b, thereby the self-retracting stopper 320b is not engageable with the corresponding fixed stopper 103b. Accordingly, the right connection between the right outer engagement element 100b and the right inner engagement element 300b is ready to be released.

In position B shown in FIG. 2E(2), the right outer engagement element 100b is disengaged from the right inner engagement element 300b.

Position C in FIG. 2E(3) shows that the right outer engagement element 100b starts to engage with the right inner engagement element 300b along the helicoidal groove 302 to establish the right connection and trigger rotation of the elongate body from the first position to the second position. During this process, the extension of the self-retracting stopper 320b is constrained by the fixed stopper 103b thereby allowing only part of the right locking element 330b to be inserted into the right inner engagement element 300b such that the resilient element 331b is in a compressed state.

When the right side of the locking device 10 is in position D shown in FIG. 2E(4), the self-retracting stopper 320b is received into the recess 101b, which allows for further extension of the self-retracting stopper 320b. Thus, the insertion portion of the right locking element 330b is biased by the resilient element 331b to further insert into the right inner engagement element 300b and the self-retracting stopper 320b is further pushed into the recess 101b such that the extended self-retracting stopper 320b is engaged with the fixed stopper 103b to secure the right connection.

Sequential Molding Tool Including a Self-Sufficient Sequential Locking Device

Figure 3:
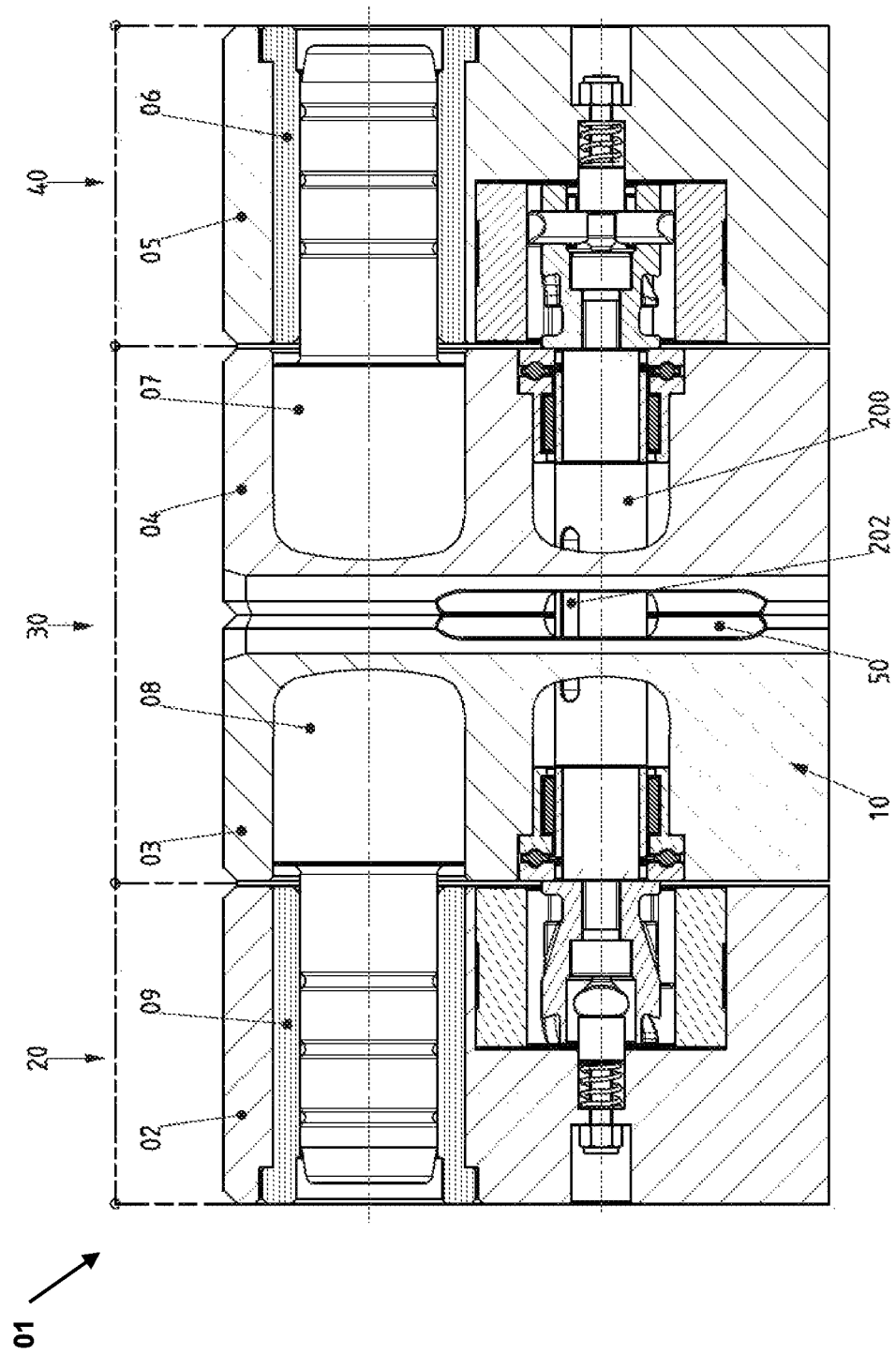
FIG. 3 shows a partial sectional view of a sequential molding tool including a self-sufficient sequential locking device according to a first embodiment of the invention.

FIG. 3 shows a partial sectional view of a sequential molding tool 01 including a self-sufficient sequential locking device 10 according to a first embodiment of the invention. In this embodiment, the self-sufficient sequential locking device 10 is used in a sequential injection molding process.

As shown in FIG. 3, the sequential molding tool 01 includes a central portion 30, left and right side portions 20 and 40, and a self-sufficient sequential locking device 10. The elongate body of the locking device 10 is provided at the central portion of the molding tool 01; the left outer engagement element and left locking element of the locking device 10 are provided at left side portion 20; and the right outer engagement element and right locking element of the locking device 10 are provided at the right side portion 40.

A first layer of the molding tool 01 is defined as the parting line between the left side portion 20 and the central portion 30, and the second layer is defined as the parting line between the central portion 30 and the right side portion 40. When the elongate body of the locking device 10 is in a first position, the left side of the locking device 10 secures the first layer, i.e. the left side portion 20 is locked to the central portion 30, while the second layer is releasable, i.e. the right side portion 40 is releasable from the central portion 30. When the elongate body is in a second position, the first layer is releasable, i.e. the left side portion 20 is releasable from the central portion 30, while the right side of the locking device 10 secures the second layer, i.e. the right side portion 40 is locked to the central portion 30.

The left side portion 20 further includes a guide bush first layer 09 assembly inserted inside the core plate first layer 02, and the right side portion 40 includes a guide bush second layer 06 inserted inside the core plate second layer 05. The central portion 30 includes guide pin second layer 07 and guide pin first layer 08 assembly in their respective cavity plate second layer 04 and cavity plate first layer 03. As it is well known, these guiding components are mounted on the sequential molding tool 01 to guide movements of the side portions 20 and 40 relative to the central portion 30 along a predetermined direction and to constrain or prevent movements of the side portions 20 and 40 along other directions. Also, these guiding components are used to securely attach the central portion 30 on the sequential molding tool 01 to prevent the central portion 30 from floating and falling away from the sequential molding tool 01.

At the central portion 30, the sequential molding tool 01 is further provided with a tool access opening 50 which is aligned with the manual rotation activator 202 provided on the shaft 200 of the sequential locking device 10 to allow manual control of shaft rotation.

The manual rotation activator 202 may be operated by a simple device such as a screwdriver or lever to control rotation of the shaft 200. Thus, the user can manually control securing and releasing of the two side portions of the sequential molding tool 01. As any repetitive lifting action on a self-sufficient sequential locking device 10 in a sequential molding tool 01 from top to bottom or vice versa will invert the releasable layer and the secured layer of the locking device 10, it is necessary to ensure the securement of each part of the sequential molding tool 01 by the manual rotation activator 202 during such lifting actions or transportation to prevent accidental release or dropping of any part of the molding tool 01.

In a sequential molding tool 01 which is installed with multiple self-sufficient locking devices 10, the user can control the rotation of each shaft 200 through a manual rotation activator provided on each of the locking devices 10. To safely transport, displace or dismantle a sequential molding tool which incorporates these sequential locking devices 10, the whole sequential molding tool 01 must be secured completely, which may be realized by only rotating one of the manual rotation activators in the molding tool 01, i.e. by inverting the releasable layer and the secured layer of only one of the locking devices 10. Of course, to further improve the safety for transportation, displacement and dismantlement of the sequential molding tool, it is preferable to rotate more than one manual rotation activator in the molding tool in case any one of the rotated manual rotation activators becomes reactivated accidentally during transportation or dismantling of the sequential molding tool.

In an example, referring to FIG. 2A, the shaft 200 of the elongate body is rotatably coupled to the central portion 30 via left roller guiding device 201a and right roller guiding device 201b. The left and right roller guiding devices 201a and 201b are securely disposed within the central portion 30 by screws, and the left and right outer engagement elements 100a and 100b are securely disposed within the left and right side portions of the sequential molding tool 01 by the screws 110a and 110b. All the screws for fastening the sequential locking device 10 extend along an axial direction of the shaft 200 within the sequential molding tool 01. As such, heads of the screws are not accessible unless the left and right side portions of the sequential molding tool 10 are in an opening state. Therefore, it could be not convenient to uninstall the locking device 10 from the sequential molding tool 01.

Figure 4:
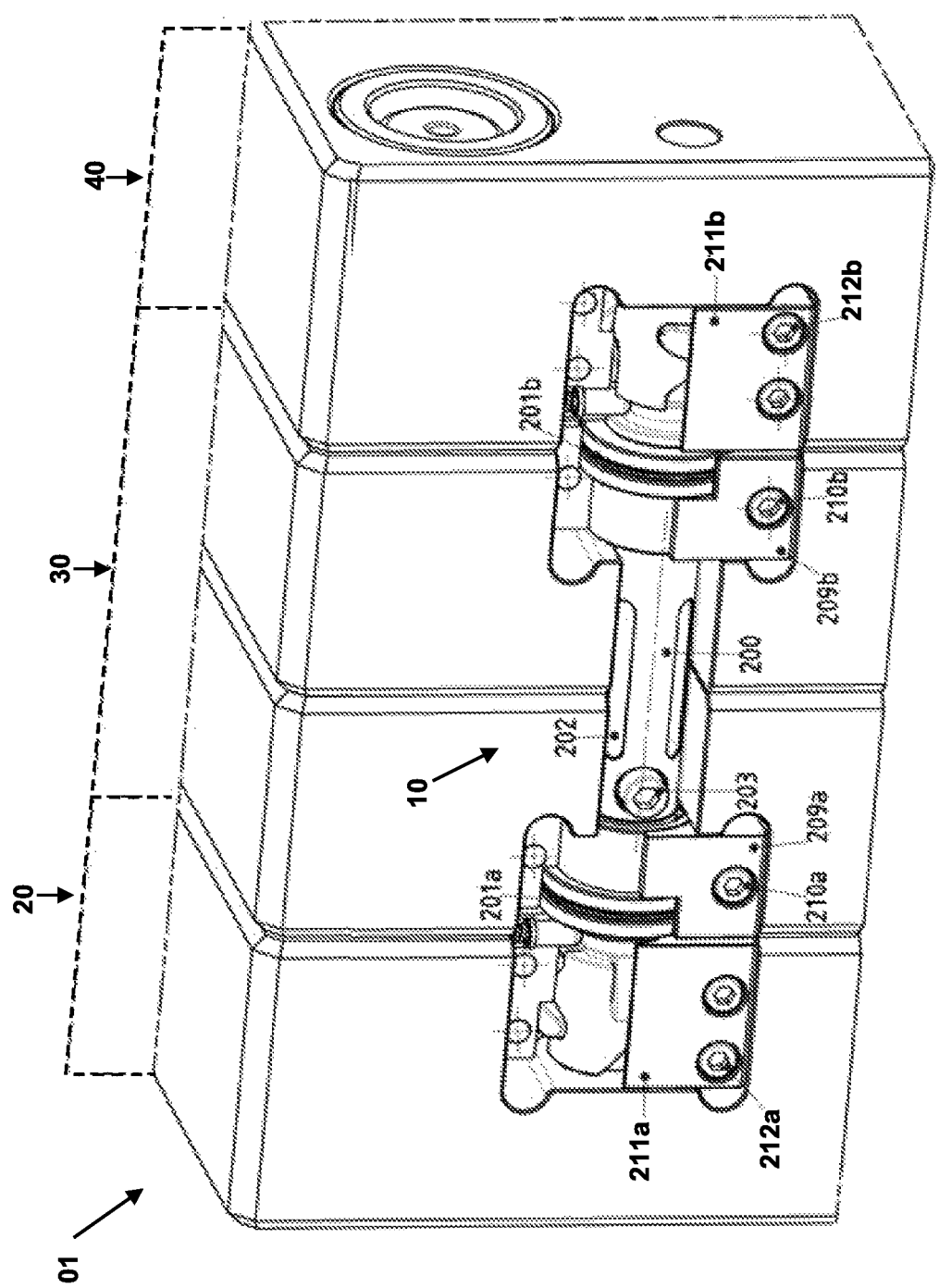
FIG. 4 shows an isometric view of a sequential molding tool including a self-sufficient sequential locking device installed on an external surface thereof.

To conveniently uninstall the locking device 10 from the sequential molding tool 01, another installation method of the sequential locking device is provided. Referring to FIG. 4, a left roller cover 209a and a right roller cover 209b are provided at the central portion 30 for covering and fixing the left and right roller guiding device 201a and 201b respectively. The left and right roller covers 209a and 209b are securely attached to a surface of the sequential molding tool 01 by their respective left roller cover screw 210a and right roller cover screw 210b which extend along a direction perpendicular to the surface of the sequential molding tool 01 and to the axial direction of the shaft 200 such that heads of the screws 210a and 210b are accessible anytime from outside of the sequential molding tool 01. Similarly, the left and right outer engagement element 100a and 100b are covered and disposed within the left and right side portions 20 and 40 of the sequential molding tool 01 by a left and a right outer engagement element cover 211a and 211b respectively. The left and right outer engagement element covers 211a and 211b are securely attached to the surface of the sequential molding tool 01 via screws 212a and 212b respectively, wherein the screws 212a and 212b extend along a direction perpendicular to the surface of the sequential molding tool 01 and the axial direction of the shaft 200.

In addition, a safety screw 203 is further provided to fix the shaft 200 to the central portion of the sequential molding tool 10 for further reinforcing the securement of the sequential molding tool 01 and thereby preventing any accidental rotation of the shaft 200 during lifting or transporting of the sequential molding tool 01.

Figure 5:
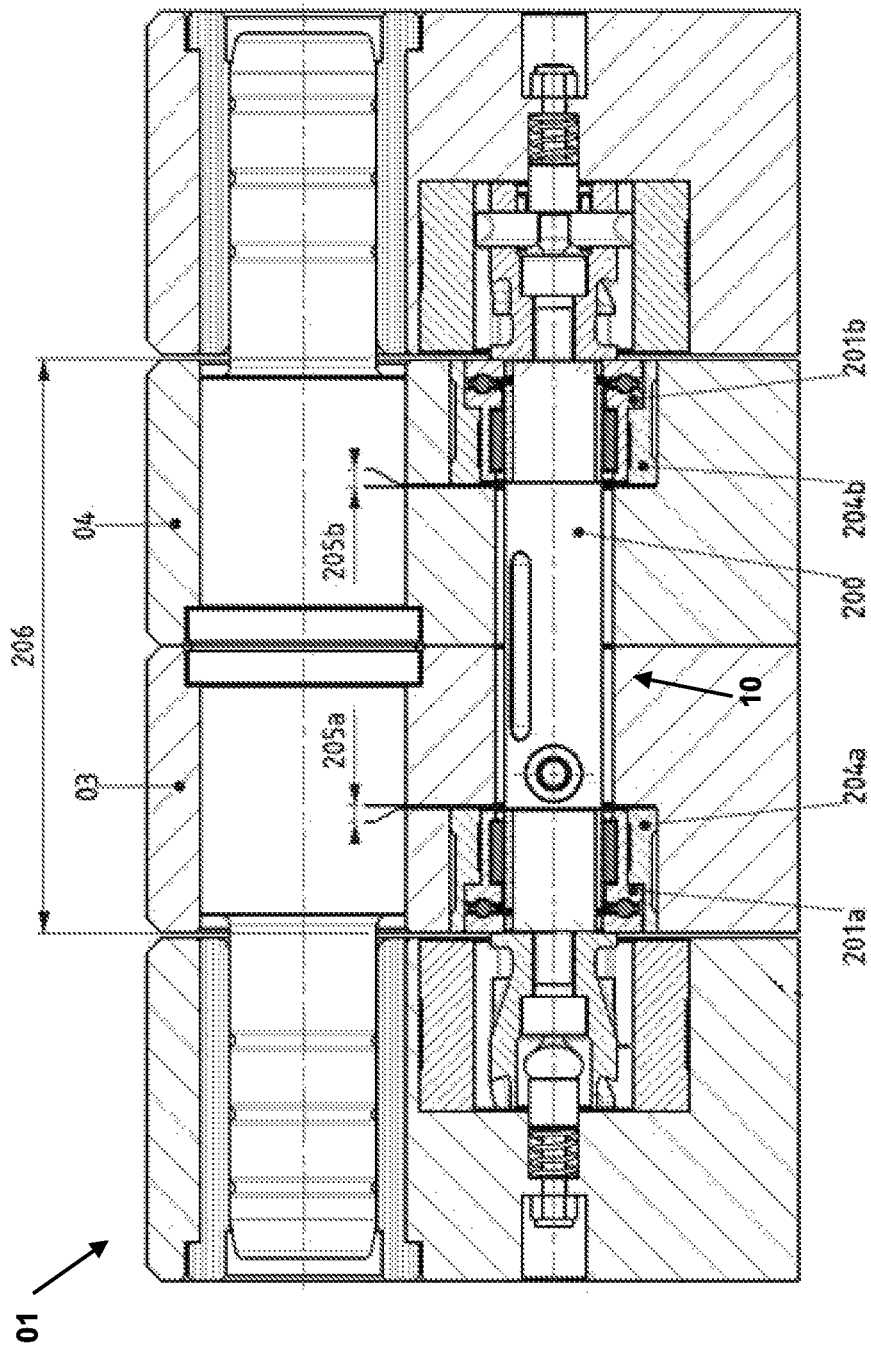
FIG. 5 shows a partial sectional view of a sequential molding tool as shown in FIG. 3.

FIG. 5 is a partial sectional view of a sequential molding tool 01 as shown in FIG. 3. The cavity plate thickness 206 in FIG. 5 refers to a cumulative width of the cavity plate first layer 03 and cavity plate second layer 04. As it is well known, both the cavity plate first layer 03 and cavity plate second layer 04 include hot runner systems, which are used to control the balancing of the flow of the resin during the injection phase. To perform this task, the hot runner systems are required to be maintained at an appropriate temperature, in which balancing of each injection nozzles will be independently adjusted. However, the temperature of the hot runner systems could increase by contact and radiance from the heat of its surrounding area, which could cause an increase of the cavity plate thickness 206.

To solve this problem, a few cooling channels are provided inside both cavity plate first layer 03 and cavity plate second layer 04, which can re-adjust the temperature to conform to the requirement of the resin, typically equivalent to a neutral temperature.

However, the temperature of a hot runner system may reach a high value when the resin is injected inside the sequential molding tool 01, and the cooling process can require temperatures higher than eighty (80) degrees Celsius, which may cause thermal expansion incompatible with any adjacent mechanical parts in the sequential molding tool 01. To prevent this unexpected thermal expansion, a left insulator 204a and a right insulator 204b could be provided in the sequential molding tool 01 for shielding the left roller cover 201a and right roller cover 201b respectively from thermal expansion. Accordingly, the shaft 200 is also insulated from thermal expansion by being not in contact with both cavity plate first layer 03 and cavity plate second layer 04. To further adequately control thermal expansion, two small clearances are provided at the axial contact area with both left insulator 204a and right insulator 204b. The requested value of the left gap 205a and right gap 205b would be determined based on the basic calculation referring to the differential temperature between both cavity plate first layer 03 and cavity plate second layer 04 and the ambient temperature of the self-sufficient sequential device 10.

Overmolding Tool Including a Self-Sufficient Overmold Latch

In the above embodiments, the self-sufficient sequential locking device 10 is used in sequential or tandem injection molding process, however, in the second embodiment of the invention, it will be explained that the self-sufficient sequential locking device can also be applied to an overmolding process.

As it is well known, an over-molding process requires the installation of at least one insert inside the overmolding tool before proceeding with the sequence of injection molding, and a typical moment selected to feed the mold with this insert is generally after the ejection of the over-molded product from the overmolding tool. It would be easy to understand that such sequences are time-consuming given that this feeding will require an additional time during an open/close session in the overmolding process.

Furthermore, it will be explained below how a double layer can be used to re-root the overmolding process during a cooling time to introduce at least one new insert inside the overmolding tool.

FIGS. 6A-6D are sectional views of an overmolding tool 900 in four different positions in an overmolding process according to the second embodiment of the invention. Referring to the FIGS. 6A to 6D, the overmolding tool 900 includes:

a moldbase having four plates: spacer plate 901, back plate 902, core plate 903, and a cavity plate 904;
a self-sufficient overmold latch 11 provided in the moldbase;
an ejection system including bottom ejector plate 905, top ejector plate 906 and ejector pin 910, a core 940 within a series of inserts including back insert 920 and next insert 921, and an overmolded insert 922 provided inside an injected part 930 which is delimited by a cavity 950 on the right side of the overmolding tool 900.

Figure 6A:
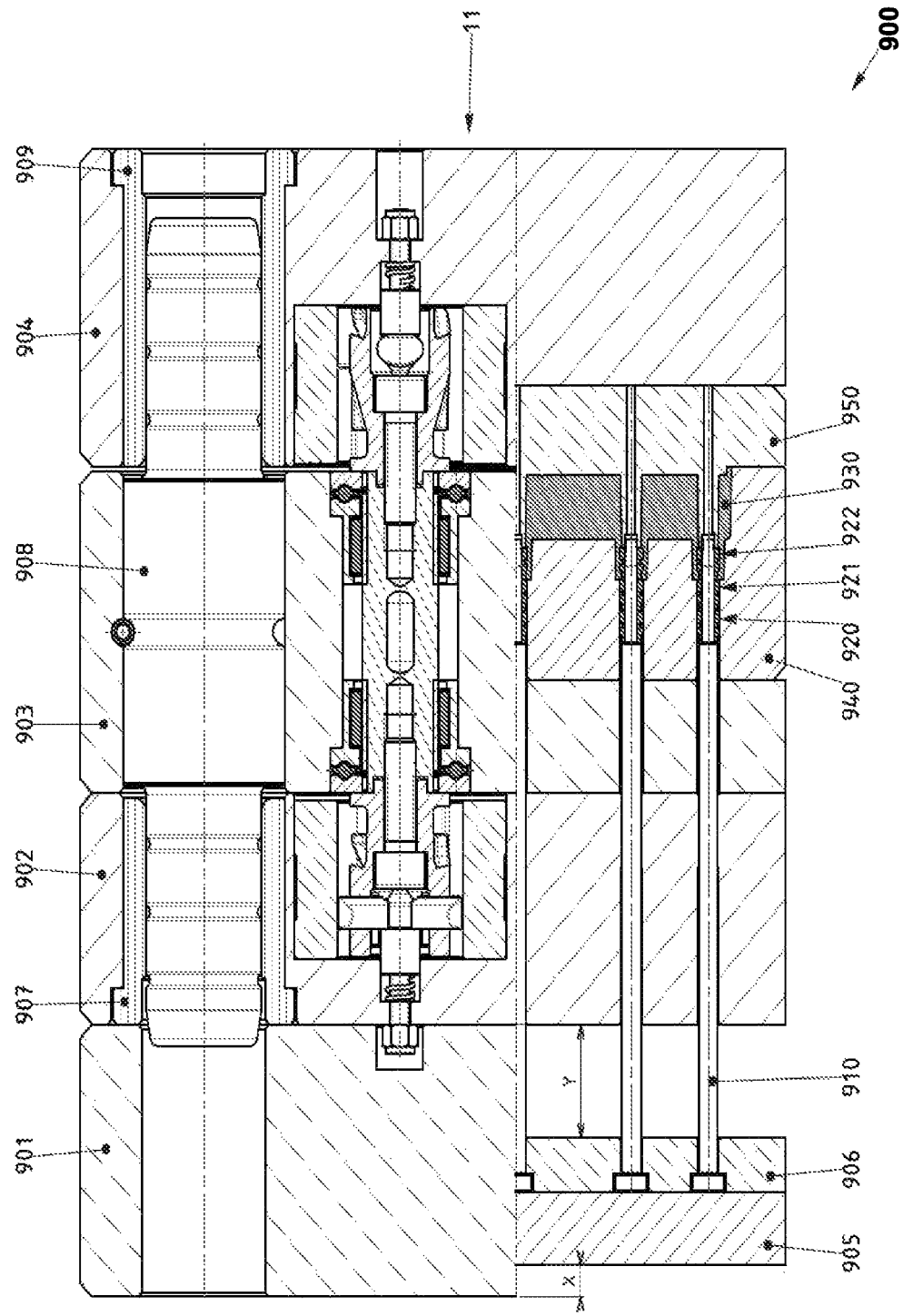
FIGS. 6A to 6D are sectional views of an overmolding tool in four different positions during an overmolding process according to a second embodiment of the invention.

As shown in FIG. 6A, the self-sufficient overmold latch 11 has similar structure and function as the self-sufficient sequential latch 10. The elongate body of the latch 11 is provided at the core plate 903 which is the central portion of the overmolding tool 900. The left outer engagement element and left locking element of the latch 11 are provided at the back plate 902 and the spacer plate 901, which are the left side portion of the overmolding tool 900, wherein the back plate 902 is adjacent to the core plate 903 while the spacer plate 901 is located remotely from the core plate 903. The right outer engagement element and right locking element of the latch 11 are provided at the cavity plate 904 which is the right side portion of the overmolding tool 900.

FIG. 6A illustrates a sectional view of the overmolding tool 900 at a closing station with the self-sufficient overmold latch 11 being in position A-D in which, the left layer between back plate 902 and core plate 903 is releasable/openable and the right layer between the core plate 903 and the cavity plate 904 is secured by the right side of the latch 11. In closing station, the positions of the bottom ejector plate 905 and top ejector plate 906 are defined by two parameters: X defining a gap between the extreme left side of spacer plate 901 and the extreme left side of the bottom ejector plate 905; and Y defining a gap between the extreme right side of the top ejector plate 906 and the extreme left side of the back plate 902, i.e. maximum ejection stroke requested for ejecting the Part 30. The dimension of X is exactly equal to the thickness of one insert.

Figure 6B:
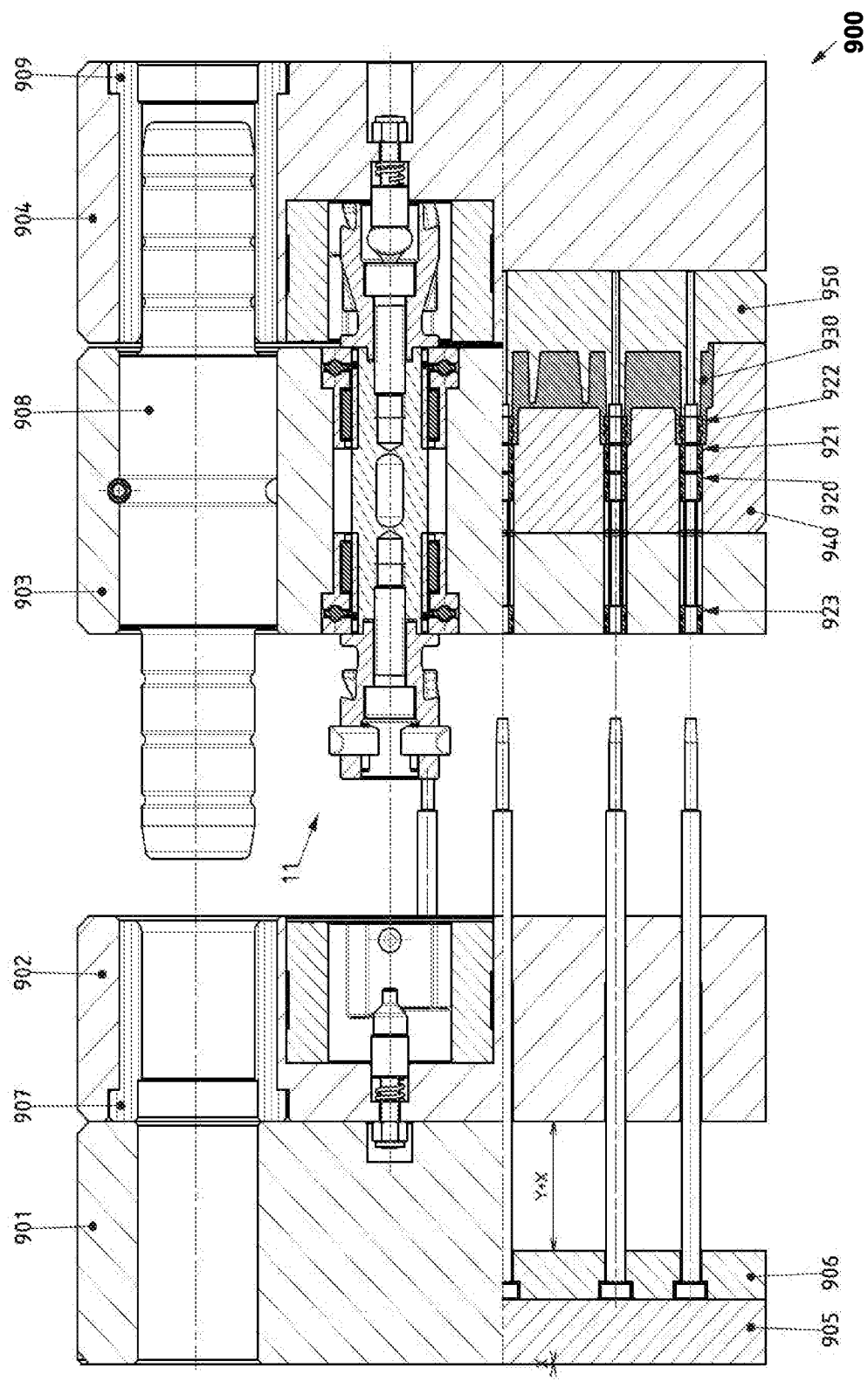

FIG. 6B illustrates a sectional view of the overmolding tool 900 in a loading station with a self-sufficient overmold latch 11 being in position B-D in which the left layer between back plate 902 and core plate 903 is opened and the right layer between core plate 903 and the cavity plate 904 is secured. It should be noted that the overmolding tool 900 reaches this position at the end of an injection holding stage during a cooling time for the injected part 930 to an acceptable release temperature. During this cooling time, the left layer is opened and the tool 900 is loaded with a new insert 923 on a backside of the core plate 903 using a conventional robot. In this position as shown in FIG. 6B, the new inserts 923 are ready to join to both back insert 920 and next insert 921 located inside the core 940. The injected part 930 and its overmolded insert 922 are still enclosed during this cooling stage by the cavity 950. The other components on the top right side such as the core plate 903 within the double guide pin 908, and the cavity plate 904 including its guide bush cavity plate 909 are still in the same secured position. The parameter X has been reduced to zero, accordingly the parameter Y is increased to Y+X, which is caused by a shift of the ejector pin 910 away from the core plate 903 at a value equal to the thickness of one insert.

Figure 6C:
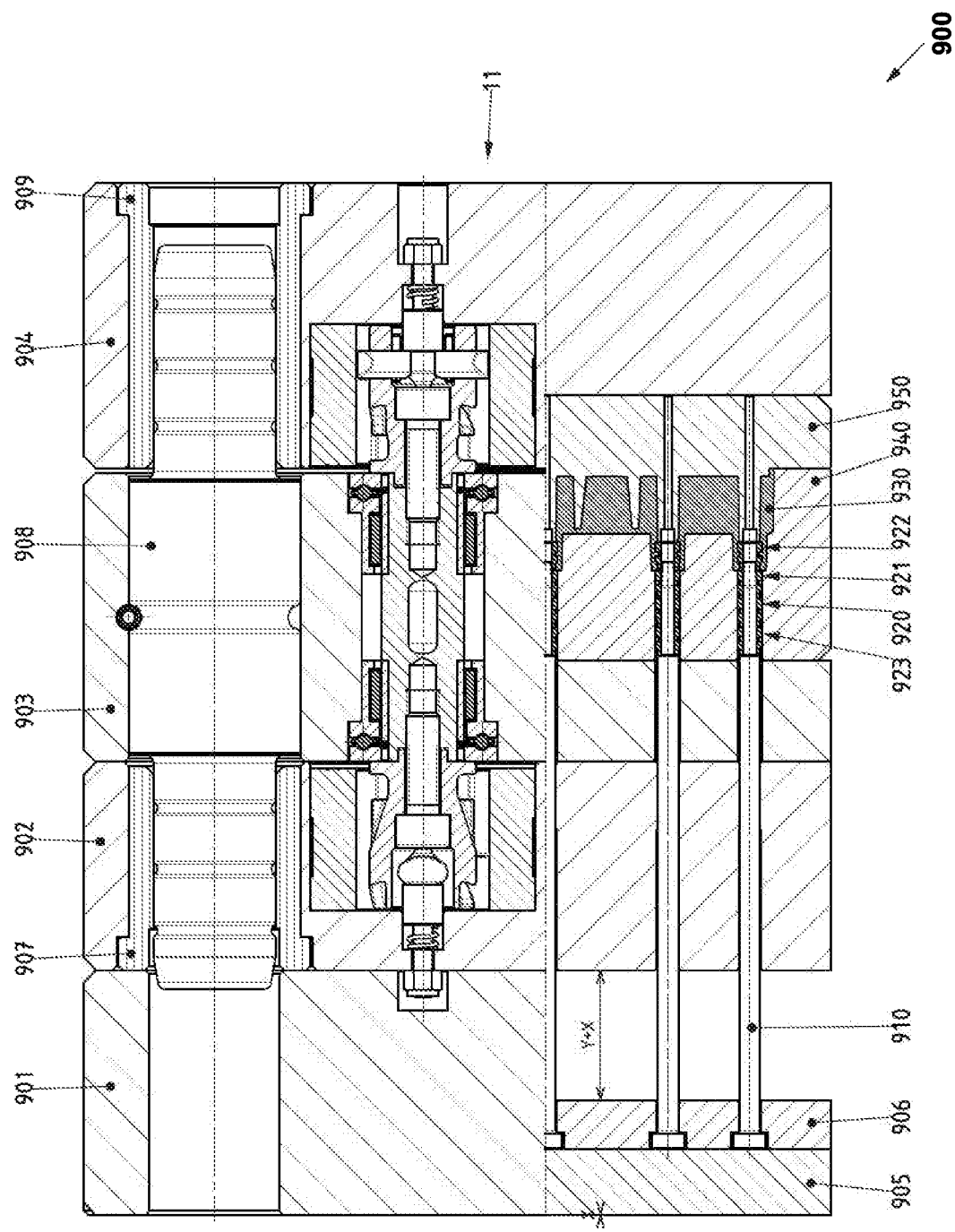

FIG. 6C illustrates a sectional view of the overmolding tool 900 in a pre-opening station with a self-sufficient overmold latch 11 being in Position D-A, in which the left layer between back plate 902 and core plate 903 is secured and the right layer between core plate 903 and the cavity plate 904 is releasable/openable. It should be noted that the closing session of the left layer will activate the possibility to open the right layer.

In this position, the moldbase including the spacer plate 901, the back plate 902, the core plate 903, and cavity plate 904 are again in a closing position. The double guide pin 908 realigns the left and right layers via the guide bush back plate 907 and the guide bush cavity plate 909. The bottom ejector plate 905 and the top ejector plate 906 have been maintained in the same position as in FIG. 6B. It will be easy to understand that during the closing session the ejector pin 910 pushed the new insert 923 to establish a perfect alignment with the back insert 920 and the next insert 921, while the injected part 930 and its overmolded insert 922 are still enclosed between the core 940 and the cavity 950 and ready to be ejected from the tool 900 when a predetermined cooling time has been reached. It should be noted that during this ejection, the dimension Y+X will decrease to zero before being reinitialized to its initial value Y and resetting the dimension X.

Figure 6D:
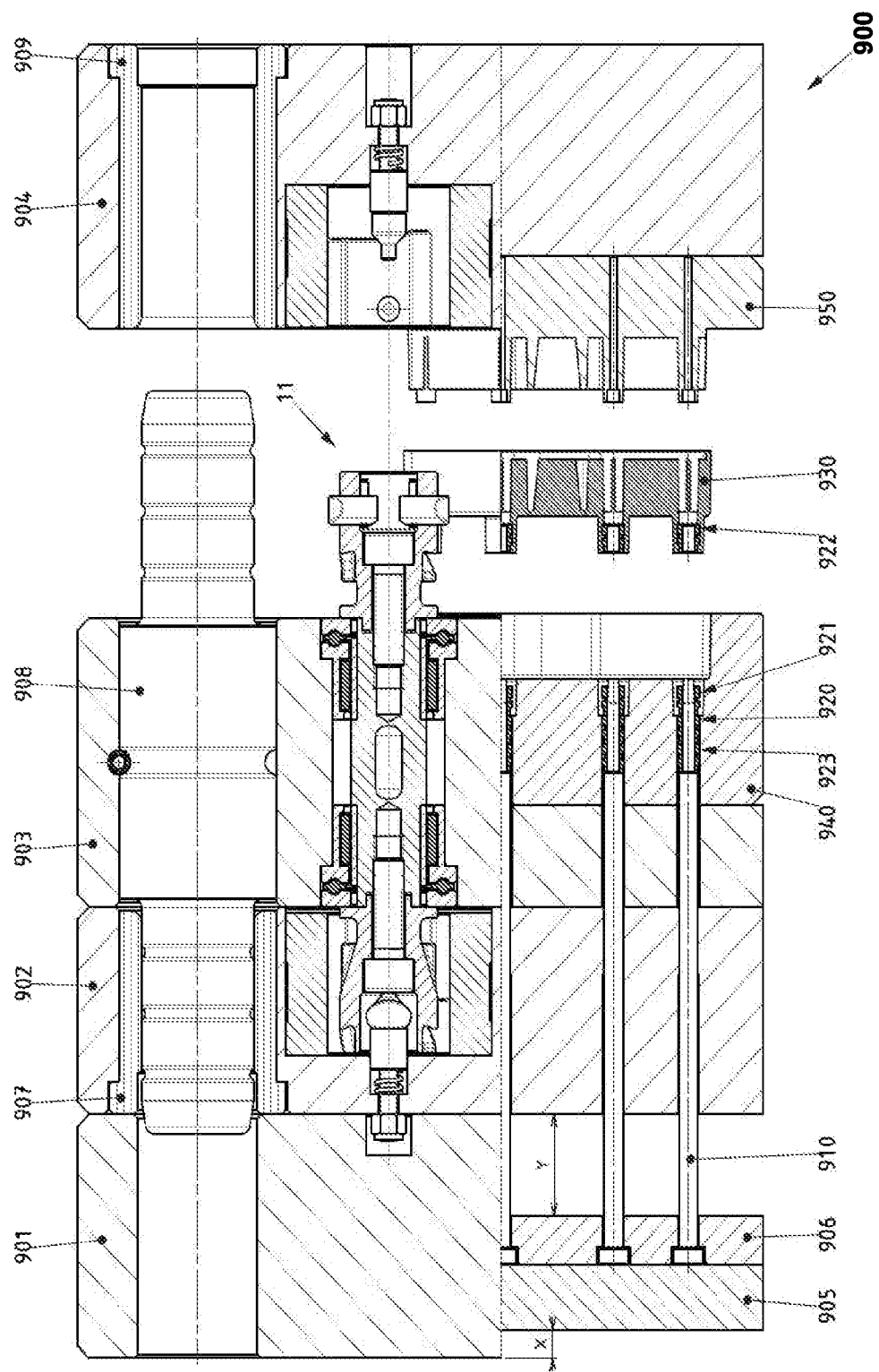

FIG. 6D illustrates a sectional view of the overmolding tool 900 in a releasing station with the self-sufficient overmold latch 11 being in Position D-B in which the left layer between the back plate 902 and the core plate 903 is secured and the right layer between the core plate 903 and the cavity plate 904 is opened. In this position, two different sequences will be introduced: the first one is related to the injected part 930 and the overmolded insert 922, and the second one is that the ejector plates move back to the initial positions. As shown in FIG. 6D, in this position, the spacer plate 901, the back plate 902, and the core plate 903 are in closed position with the double guide pin 908 providing the realignment via the guide bush back plate 907. The cavity plate 904 within the guide bush cavity plate 909 is now in opening session, i.e. the right connection of the self-sufficient overmold latch 11 is released. The injected part 930 within the overmolded insert 922 is now detached from the core 940 and the cavity 950, and ready to fall on a conveyor or be evacuated by a robot arm. The bottom ejector plate 905 and top ejector plate 906 have moved back to their initial positions as represented by parameters X and Y. The ejector pin 910 has been shifted towards the core plate 903 during the ejection of the new insert 923 and the following back insert 920 and next insert 921. It is to be understood that after the closing of the right layer of the overmolding tool 900, the self-sufficient overmold latch 11 will be alternated again, and the overmolding tool 900 will be ready for a new injection phase as introduced in FIGS. 6A to 6D.

As will be appreciated from the above, embodiments of the invention provide an entirely mechanical self-sufficient sequential locking device, which can be applied to both sequential injection molding and overmolding processes. With this self-sufficient sequential locking device, two layers of an injection molding tool are configured to be closed and opened in an alternating sequence without the need for external actuator or controller, as the securing or release of two sides of the sequential locking device are mechanically actuated by the engagement or disengagement of the corresponding outer engagement element with the corresponding inner engagement element, and both the engagement of the corresponding outer and the corresponding inner engagement element, and the cooperation of the locking element with the corresponding inner engagement element are solely actuated by alternating securing and releasing of two side portions in the injection molding tool, without requiring external control. Since no external actuator or controller is required, the manufacturing, operating and installation costs of the sequential locking device and the injection molding tool will be significantly reduced. Accordingly, plastic parts can be produced by the injection molding tool at a lower cost. Further, as the sequential locking device is a completely mechanical system, the user/manufacturer does not need pre-defined, pre-set, or pre-adjusted configuration parameters during the installation or operation of the injection molding tool, and thus the setup and operating of the injection molding tool will become more predictable and simplified. In addition, the sequential locking device can be fully integrated into the sequential molding tool or overmolding tool without causing substantial change in the size of the injection molding tool.

It is to be understood that the embodiments and features described above should be considered as examples and not restrictive. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

TABLE OF REFERENCE NUMERALS IN DRAWINGS

| | |
|---|---|
| 01 | Sequential Molding Tool |
| 02 | Core Plate First Layer |
| 03 | Cavity Plate First Layer |
| 04 | Cavity Plate Second Layer |
| 05 | Core Plate Second Layer |
| 06 | Guide Bush Second Layer |
| 07 | Guide Pin Second Layer |
| 08 | Guide Pin First Layer |
| 09 | Guide Bush First Layer |
| 10 | Self-Sufficient Sequential Locking device |
| 11 | Self-Sufficient Overmold Latch |
| 20 | Left Side Portion |
| 30 | Central Portion |
| 40 | Right Side Portion |
| 50 | Tool Access Opening |
| 100a | Left Outer Engagement Element |
| 100b | Right Outer Engagement Element |
| 101a | First Recess in Left Outer Engagement Element |
| 102a | Second Recess in Left Outer Engagement Element |
| 101b | First Recess in Right Outer Engagement Element |
| 102b | Second recess in Right Outer Engagement Element |
| 103a | First Fixed Stopper in Left Outer Engagement Element |
| 104a | Second Fixed Stopper in Outer Engagement Element |
| 103b | First Fixed Stopper in Right Outer Engagement Element |
| 104b | Second Fixed Stopper in Right Outer Engagement Element |
| 110a | Screw for Left Outer Engagement Element |
| 110b | Screw for Right Outer Engagement Element |
| 120a | Left Engagement Means |
| 120b | Right Engagement Means |
| 121a | Spring of Left Engagement Means |
| 121b | Spring of Right Engagement Means |
| 200 | Shaft |
| 201a | Left Roller Guiding Device |
| 201b | Right Roller Guiding Device |
| 202 | Manual Rotation Activator |
| 203 | Safety Screw |
| 204a | Left Insulator |
| 204b | Right Insulator |
| 205a | Left Gap |
| 205b | Right Gap |
| 206 | Cavity Plates Thickness |
| 209a | Left Roller Cover |
| 209b | Right Roller Cover |
| 210a | Left Roller Cover Screw |
| 210b | Right Roller Cover Screw |
| 211a | Left Engagement Element Cover |
| 211b | Right Engagement Element Cover |
| 212a | Left Engagement Element Cover Screw |
| 212b | Right Engagement Element Cover Screw |
| 300a | Left Inner Engagement Element |
| 300b | Right Inner Engagement Element |
| 301 | Straight Groove |
| 302 | Helicoid Groove |
| 303 | Circular Groove |
| 310a | Screw for Left Inner Engagement Element |
| 310b | Screw for Right Inner Engagement Element |

-continued

TABLE OF REFERENCE NUMERALS IN DRAWINGS

| | |
|---|---|
| 320a | First self-retracting Stopperon Left Inner Engagement Element |
| 320b | First self-retracting Stopper on Right Inner Engagement Element |
| 321a | Second self-retracting Stopper on Left Inner Engagement Element |
| 321b | Second self-retracting Stopper on Right Inner Engagement Element |
| 330a | Left Locking Element |
| 330b | Right Locking Element |
| 331a | Spring of Left Locking Element |
| 331b | Spring of Right Locking Element |
| 900 | Overmolding Tool |
| 901 | Spacer Plate |
| 902 | Back Plate |
| 903 | Core Plate |
| 904 | Cavity Plate |
| 905 | Bottom Ejector Plate |
| 906 | Top Ejector Plate |
| 907 | Guide Bush Back Plate |
| 908 | Double Guide Pin |
| 909 | Guide Bush Cavity Plate |
| 910 | Ejector Pin |
| 920 | Back Insert |
| 921 | Next Insert |
| 922 | Overmolded Insert |
| 923 | New Insert |
| 930 | Injected Part |
| 940 | Core |
| 950 | Cavity |

The invention claimed is:

1. A self-sufficient sequential locking device, comprising:
an elongate body having two ends which are provided with a first and a second inner engagement element respectively;
a first and a second outer engagement element selectably engageable with the first and second inner engagement elements respectively for alternatively establishing a first or a second connection by moving the elongate body between a first position in which the first connection is secured and the second connection is simultaneously releasable, and a second position in which the second connection is secured and the first connection is simultaneously releasable; and
a first locking element cooperable with the first inner engagement element for securing the first connection when the elongate body is in the first position and a second locking element cooperable with the second inner engagement element for securing the second connection when the elongate body is in the second position;
wherein the moving of the elongate body between the first and the second position is mechanically actuated by engagement of the first outer engagement element with the first inner engagement element or the second outer engagement element with the second inner engagement element.

2. The device according to claim 1, wherein the engagement of the first outer engagement element with the first inner engagement element or the second outer engagement element with the second inner engagement element to alternatively establish the first or the second connection, is solely actuated by alternating securing and releasing of parting lines in an injection molding tool incorporating the sequential locking device.

3. The device according to claim 1, wherein the cooperation of the first locking element with the first inner engagement element or the second locking element with the second inner engagement element to alternatively secure the first or the second connection-, is solely actuated by alternating securing and releasing of parting lines in an injection molding tool incorporating the sequential locking device.

4. The device according to claim 1, wherein each of the first and second inner engagement elements includes a tubular structure, and a pair of self-retracting stoppers provided thereon;
each of the first and second locking elements includes an elongate locking protrusion removably insertable into the tubular structure of the corresponding inner engagement element to prevent retraction of the self-retracting stoppers; and
each of the first and second outer engagement elements includes a tubular structure and fixed stoppers provided on an inner surface thereof for engaging with the self-retracting stoppers to correspondingly secure the first or second connection.

5. The device according to claim 4, wherein each of the first and second inner engagement elements includes a helicoidal groove and a straight groove fluidly coupled to the helicoidal groove, which are formed on an outer surface of the tubular structure thereof; and
wherein each of the first and second outer engagement elements includes an engagement means provided at an inner surface of a corresponding outer engagement element, which is releasably engageable with the helicoidal groove of the corresponding inner engagement element for securing the first or the second connection correspondingly by rotation of the elongate body between the first and second positions, and is further releasably engageable with the straight groove of the corresponding inner engagement element for releasing the first or the second connection correspondingly.

6. The device according to claim 5, wherein the engagement means includes:
a projection member movable along the helicoidal groove of a corresponding inner engagement element for securing the first or the second connection correspondingly, and movable along a straight groove of a corresponding inner engagement element for releasing a corresponding connection; and
a resilient means supporting the projection member against the inner surface of a corresponding outer engagement element for biasing the projection member to abut against the helicoidal groove or the straight groove.

7. The device according to claim 1, wherein the elongate body includes a shaft having two ends, and the first and second inner engagement elements are attached to the two ends of the shaft respectively.

8. The device according to claim 7, further comprising a rotation activator provided on the shaft and manually operable to rotate the elongate body, wherein the manual rotation activator is configured for manual operation to rotate the elongate body such that both the first connection and the second connection are secured and wherein the manual rotation activator includes a groove formed on the shaft.

9. The device according to claim 1, wherein each of the first and second locking elements includes an insertion portion and a resilient means for biasing the insertion portion into a corresponding inner engagement element to secure the first or second connection.

10. A method for installing a self-sufficient sequential locking device as claimed in claim 1 to an injection molding tool which includes a central portion, and a first and a second side portion releasably coupled to the central portion, the method comprising:

incorporating an elongate body of the locking device at the central portion of the injection molding tool;

incorporating a first outer engagement element and a first locking element of the locking device at the first side portion; and incorporating a second outer engagement element and a second locking element of the locking device at the second side portion, such that alternating securing and releasing of the first and second side portions in the injection molding tool actuates engagement of a first outer with a first inner engagement element or a second outer with a second inner engagement element to alternatively establish a first or a second connection, and cooperation of the first locking element with the first inner engagement element or the second locking element with the second inner engagement element to alternatively secures the first or the second connection.

11. The method according to claim 10, wherein:

the elongate body of the locking device is rotatably coupled to the central portion by a first and a second roller guiding device, which are securely coupled to the central portion by screws extending along an axial direction of the elongate body within the injection molding tool; and the first and second outer engagement elements are securely disposed within the first and second side portions respectively by screws extending along an axial direction of the elongate body within the injection molding tool.

12. An injection molding tool comprising:

a central portion;

first and second side portions releasably coupled to the central portion; and a self-sufficient sequential locking device as claimed in claim 1;

wherein the elongate body of the locking device is incorporated at the central portion of the injection molding tool, the first outer engagement element and the first locking element of the locking device are incorporated at the first side portion, and the second outer engagement element and the second locking element of the locking device are incorporated at the second side portion;

wherein when the elongate body is in a first position, the first connection is secured by the first locking element such that the first side portion is locked to the central portion, while the second connection is releasable such that the second side portion is releasable from the central portion; and wherein when the elongate body is in the second position, the first connection is releasable such that the first side portion is releasable from the central portion, while the second connection is secured by the second locking element such that the second side portion is locked to the central portion.

13. The tool according to claim 12, wherein the elongate body is rotatably coupled to the central portion by a first and a second roller guiding device, which are securely coupled to the central portion by screws extending along an axial direction of the elongate body within the injection molding tool, and the first and second outer engagement elements are securely disposed within the first and second side portions respectively by screws extending along an axial direction of the elongate body within the injection molding tool.

14. The tool according to claim 12, wherein the elongate body is rotatably coupled to the central portion by a first and a second roller guiding device wherein the first and second roller guiding device are securely disposed within the central portion by a first and a second roller cover, respectively, and the first and second roller cover are attached to a surface of the injection molding tool by screws extending along a direction perpendicular to the surface and to the axial direction of the elongate body; and wherein the first and second outer engagement elements are securely disposed within the first and second side portions, respectively, by a first and a second engagement element cover, and the first and second engagement element cover are attached to the surface of the injection molding tool by screws extending along a direction perpendicular to the surface and to the axial direction of the elongate body.

15. The tool according to claim 12, wherein the injection molding tool is an overmolding tool, wherein the central portion includes a core plate, the first side portion includes a back plate and a spacer plate which is remote from the central portion, and the second side portion includes a cavity plate.

16. The tool according to claim 15, further comprising:

a first insert provided at a backside of the core plate;

a second and a third insert provided at a core in the core plate of the overmolding tool;

an ejector pin provided at a spacer plate and the back plate; and an overmolded insert;

wherein during a cooling time of an injected part and releasing of the first connection, the first insert is configured to be ready to join to the second and the third insert, the injected part and the overmolded insert thereof are enclosed by a cavity in the cavity plate, and the ejector pin is moved away from the core plate by a distance equal to a thickness of the first insert.

17. The tool according to claim 16, wherein the overmolded insert is further configured to detach, together with the injected part, from the core and the cavity and be ready to be taken out from the overmolding tool, and the ejector pin is further configured to move towards the core plate by a distance equal to a thickness of the first insert when the second connection between the core plate and the cavity plate is released.

18. A method for sequentially locking first and second side portions of an injection molding tool as claimed in claim 12, to the central portion thereof, the method comprising:

using alternating securing and releasing of the first and second side portions of the injection molding tool;

engaging, in alternating sequence, the first outer engagement element with the first inner engagement element to establish the first connection, and the second outer engagement element with the second inner engagement element to establish the second connection, by moving the elongate body between the first position and the second position; and cooperating, the first locking element with the first inner engagement to secure the first connection when the elongate body is in the first position, and cooperating the second locking element with the second inner engagement to secure the second connection when the elongate body is in the second position.

19. The method according to claim 18, wherein the injection molding tool is an overmolding tool, wherein the central portion includes a core plate, the first side portion includes a back plate and a spacer plate which is remote from the central portion, and the second side portion includes a cavity plate; and further comprising:

during a cooling time of an injected part, releasing the first connection and providing a first insert at a backside of the core plate, wherein with releasing of the first connection, the first insert is ready to join to a second and a third insert provided at a core in the core plate of the overmolding tool, an injected part and an overmolded insert thereof are enclosed by a cavity in the cavity plate, and an ejector pin is moved away from the core plate by a distance equal to thickness of the first insert.

20. The method according to claim 19, wherein when the second connection between the core plate and the cavity plate is released, the injected part and overmolded insert thereof are detached from the core and the cavity and ready to be taken out from the overmolding tool, and the ejector pin is moved towards the core plate by a distance equal to a thickness of the first insert.

\* \* \* \* \*